Feb. 10, 1925.

E. JOHNSON

PIPE COUPLING

Filed May 12, 1924

Edward Johnson
INVENTOR

BY Victor J. Evans
ATTORNEY

WITNESS:

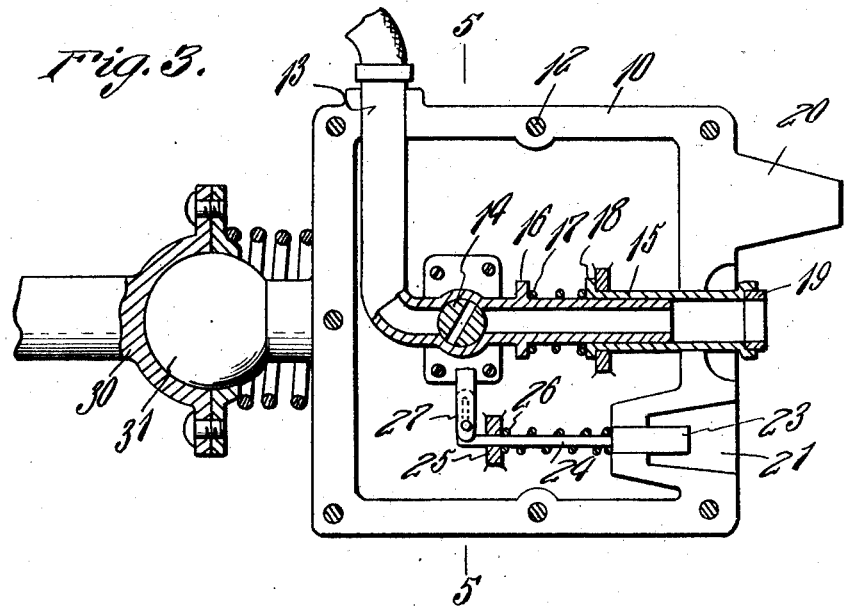
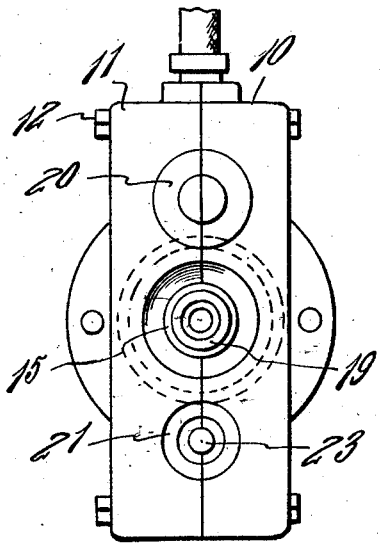
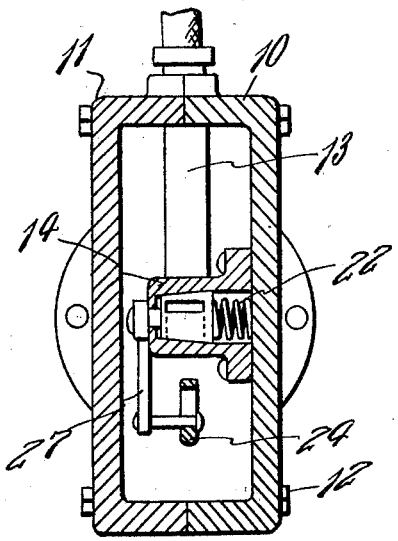

Patented Feb. 10, 1925.

1,526,218

UNITED STATES PATENT OFFICE.

EDWARD JOHNSON, OF COVINGTON, KENTUCKY.

PIPE COUPLING.

Application filed May 12, 1924. Serial No. 712,771.

*To all whom it may concern:*

Be it known that I, EDWARD JOHNSON, a citizen of the United States, residing at Covington, in the county of Kenton and State of Kentucky, have invented new and useful Improvements in Pipe Couplings, of which the following is a specification.

This invention relates to train pipe couplings, and contemplates a structure wherein the adjacent ends of the pipe line for air is coupled simultaneously with the coupling of the cars, and the air valves arranged in the pipe line sections automatically and simultaneously opened.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a view partly in section showing half of the coupling head, and the normal position of the coupling sleeve of one of the pipe sections, Figure 4 is an end view of one of the coupling heads, Figure 5 is a sectional view taken on line 5—5 of Figure 3.

Figure 1:
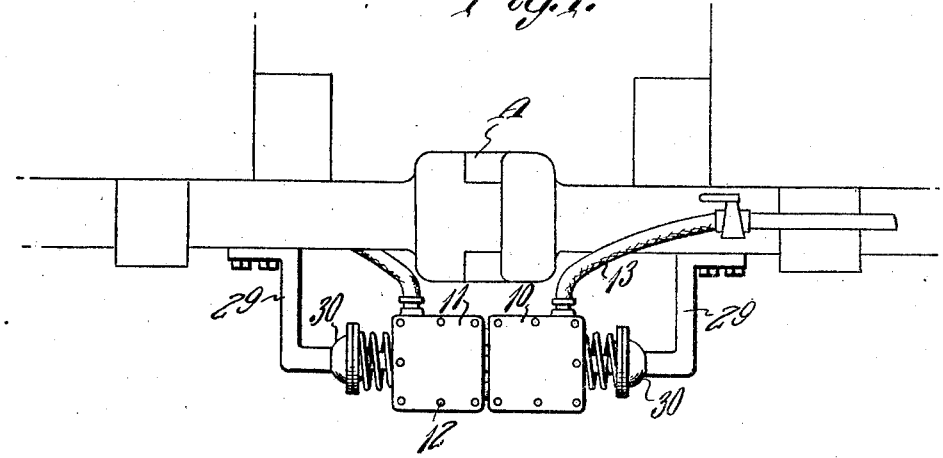
Figure 1 is a view of the coupling showing the coupling head associated.

Referring to the drawings in detail, A represents the coupling between two adjacent cars, and as will be noted in Figure 1, the coupling for the train pipe is shown directly beneath this coupling A.

Figure 2:
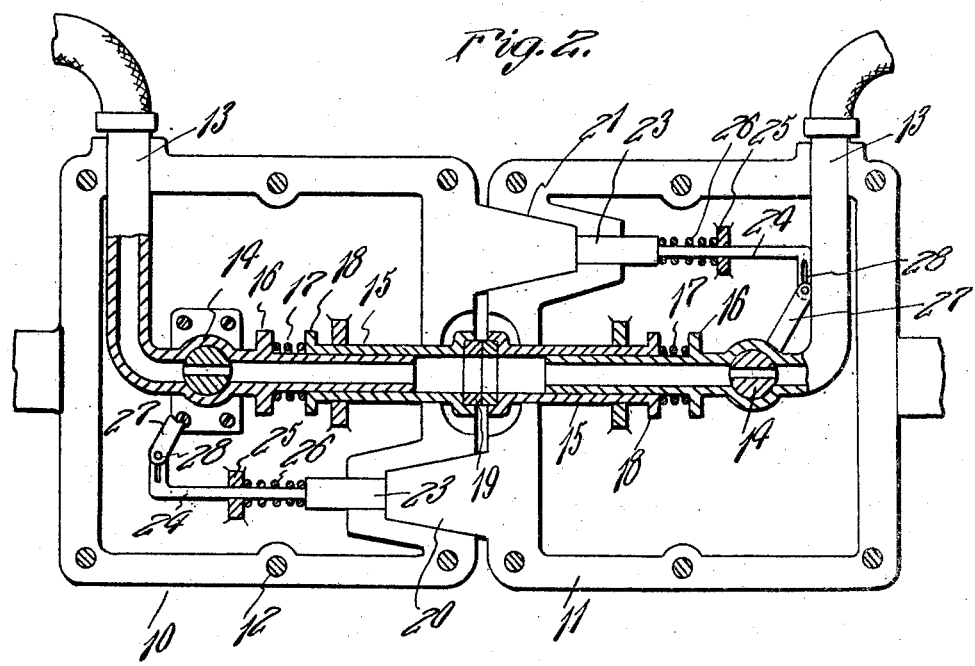
Figure 2 is a vertical sectional view through the train pipe coupling shown in Figure 1.

The train pipe coupling for the air line sections includes what I term coupling heads, there being one of these heads carried by each car and constructed for interfitting association when the cars are coupled together through the instrumentality of the coupling A. Each coupling head consists of a casing divided into halves, the halves of one head being indicated at 10 and 11 respectively, and these halves are secured together by bolts or any other suitable fastening elements indicated at 12. Each head is of hollow formation as is clearly shown in Figure 5 to accommodate the adjacent end of the train pipe section 13, and also the mechanism employed to automatically open the valve 14 in said pipe section, when the coupling heads are brought together. When the halves 10 and 11 are joined together, they unitedly define a central opening through which projects a sleeve 15, this sleeve being slidably mounted upon the end of the train pipe section 13 which is arranged within the head of the coupling. The pipe section is formed with a flange 16 against which bears one end of a coil spring 17, the other end of this spring bearing against the flange 18 formed on the sleeve 15, so that the spring normally maintains the sleeve projected through the coupling member as clearly shown in Figure 3. The outer end of each sleeve is formed to support a gasket 19, so that when the adjacent pipe line sections are arranged in end to end relation, incident to the coupling of the cars, a fluid tight joint will be provided between said train line sections. Projecting from each coupling head is a substantially cone shaped extension formed in halves, one-half being carried by each part of the head and indicated at 20. Each part of the coupling head is further formed with a depression 21, and when the respective parts 10 and 11 of the coupling head are connected together, these depressions form a pocket of a contour to receive the cone shaped projection carried by the other coupling head. Consequently when the cars are coupled together, the heads of the train pipe coupling are also interfittingly associated, in that the projection 20 on one coupling head is received by the cone shaped pocket 21 on the other coupling head, while the coupling sleeves 15 of the respective heads are joined in end to end relation and are effectively held in the position shown in Figure 2 by means of the springs 17.

As hereinabove stated each train pipe section is provided with a valve 14, and this valve is normally held closed by means of the spring 22 clearly shown in Figure 5. It is my purpose however to automatically open these valves when the coupling heads are joined together, for which purpose I preferably employ the mechanism shown. This mechanism includes a plunger 23 arranged to slide within the pocket 21 of each coupling head, the plunger being supported by one end of a rod 24 arranged to slide through a suitable bracket 25. A coil spring 26 surrounds the rod 24 and has its opposite ends bearing against the bracket 25 and plunger 23 to normally hold the plunger in a position shown in Figure 3, in which position it is engaged by the projection 20 carried by the other coupling head when said coupling heads are operatively associated. A link 27 is connected with the valve 14 and a slot and pin 28 provides a connection between the link 27 and the rod 24. Manifestly when the coupling heads are coupled together, the projection 20 on one head engages the plunger 23 carried by the other head, moving the plunger inwardly from the position shown in Figure 3 to the position shown in Figure 2, thereby automatically opening the valves 14 in each train pipe section 13. It is of course to be understood that the coupling heads can be mounted upon the cars in any suitable manner, but for this purpose I have shown a bracket arm 29 which terminates to provide a socket 30 to receive the spherical head 31 projecting from one end of each coupling head.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

I claim:

A train pipe coupling including a pair of coupling heads, a train pipe section supported by each head and having its terminal arranged therein, a spring pressed coupling sleeve arranged to slide on the end of said pipe section and normally projected through an opening in said head, a cone shaped projection extending from each head, a pocket formed in each head to receive the cone shaped projection on the other head, a normally closed valve in each pipe section, and means for automatically opening said valves when said heads are coupled; said means including a spring pressed plunger normally arranged in the pocket of said head and adapted to be actuated by the projection received by said pocket.

In testimony whereof I affix my signature.

EDWARD JOHNSON.